(12) United States Patent
Streid (10) Patent No.: US 11,256,465 B2
(45) Date of Patent: Feb. 22, 2022

(54) WIDE FIELD OF VIEW VISUAL DISPLAY SYSTEM IN AN AIRCRAFT FLIGHT SIMULATOR USING FLAT DISPLAY PANELS

(71) Applicant: The Boeing Company, Chicago, IL (US)

(72) Inventor: Harry R. Streid, Chicago, IL (US)

(73) Assignee: The Boeing Company, Chicago, IL (US)

( * ) Notice: Subject to any disclaimer, the term of this patent is extended or adjusted under 35 U.S.C. 154(b) by 255 days.

(21) Appl. No.: 16/421,835

(22) Filed: May 24, 2019

(65) Prior Publication Data

US 2020/0371735 A1 Nov. 26, 2020

(51) Int. Cl.
*G06F 3/14* (2006.01)
*G09B 9/30* (2006.01)
*G09G 3/3208* (2016.01)

(52) U.S. Cl.
CPC ........... *G06F 3/1446* (2013.01); *G09B 9/308* (2013.01); *G09G 3/3208* (2013.01); *G09G 2300/026* (2013.01); *G09G 2380/12* (2013.01)

(58) Field of Classification Search
CPC .......... G09B 9/30; G09B 9/301; G09B 9/302; G09B 9/307; G06F 3/1446; G06F 3/1423; G06F 1/1647; G09F 9/3026; G09G 2300/026; Y10S 345/903
USPC ........ 434/44, 38; 348/121, 123; 345/1.1, 1.3
See application file for complete search history.

(56) References Cited

U.S. PATENT DOCUMENTS

| | | | | |
|---|---|---|---|---|
| 5,523,769 A * | 6/1996 | Lauer | ..................... | G06F 3/1446 345/1.3 |
| 5,746,599 A * | 5/1998 | Lechner | .................. | G06T 3/403 348/123 |
| 5,926,153 A * | 7/1999 | Ohishi | ..................... | G09B 9/32 345/1.1 |
| 6,152,739 A * | 11/2000 | Amery | ..................... | G09B 9/34 434/38 |
| 6,989,800 B2 * | 1/2006 | McLaughlin | ............. | G09F 9/30 345/1.3 |
| 2009/0066858 A1 * | 3/2009 | Turner | ................. | H04N 9/3147 348/744 |

(Continued)

OTHER PUBLICATIONS

Brown, Michael, Oct. 16, 2017. 6-Screen X-Plane with Dreamfoil Bell 407 Helicopter. Available at: https://youtu.be/9LnFDgzQseI> (Year: 2017).*

(Continued)

*Primary Examiner* — Koosha Sharifi-Tafreshi
(74) *Attorney, Agent, or Firm* — Quinn IP Law (57) ABSTRACT

A wide field of view visual display system and aircraft flight simulator uses inexpensive, consumer grade flat display panels, such as active matrix organic light-emitting diode display panels. A plurality of the side display panels are arranged in a left side vertical array at a left hand side of the pilot seat of the flight simulator, and in a right side vertical array at a right hand side of the pilot seat. A top edge of a bottom, left side display panel in the left side vertical array and a bottom edge of an upper, left side display panel in the left side vertical array overlap. A top edge of a bottom, right side display panel in the right side vertical array and a bottom edge of an upper, right side display panel in the right side vertical array overlap.

20 Claims, 7 Drawing Sheets

(56) References Cited

U.S. PATENT DOCUMENTS

| | | | | |
|---|---|---|---|---|
| 2013/0181901 A1* | 7/2013 | West | .................. | G09G 5/14 |
| | | | | 345/161 |
| 2013/0328777 A1* | 12/2013 | Johnson | ............... | H04N 13/356 |
| | | | | 345/161 |
| 2014/0272809 A1* | 9/2014 | Martel | .................. | G09B 9/30 |
| | | | | 434/38 |
| 2016/0350052 A1* | 12/2016 | Chang | ................ | G09G 3/3208 |

OTHER PUBLICATIONS

RookieRaceline, "Is this acceptable and if not how can i fine tune the overlap?", Aug. 24, 2018, reddit. Retrieved from Internet: https://www.reddit.com/r/iRacing/comments/99wlpu/is_this_acceptable_ and_if_not_how_can_i_fine_tune/ (Year: 2018).*

* cited by examiner

WIDE FIELD OF VIEW VISUAL DISPLAY SYSTEM IN AN AIRCRAFT FLIGHT SIMULATOR USING FLAT DISPLAY PANELS

FIELD

This disclosure pertains to a wide field of view visual display system for an aircraft flight simulator that employs a plurality of active matrix organic light-emitting diode (AMOLED) display panels. More specifically, this disclosure pertains to a wide field of view visual display system for an aircraft flight simulator that employs a plurality of flat, AMOLED display panels that are positioned around the pilot seat of the flight simulator in relative positions that eliminate large discontinuities between adjacent display panels and eliminate cross reflections between the plurality of display panels in the flight simulator.

BACKGROUND

Wide field of view display systems for aircraft flight simulators are typically constructed with front or rear projection screens that are arranged around a pilot seat of the flight simulator. Multiple video projectors are positioned relative to the front or rear projection screens and project portions of images on the projection screens to create a composite image on the plurality of projection screens of the flight simulator.

The typical display system for an aircraft flight simulator is large and expensive due to the required number of front or rear projection screens and their associated video projectors. The display system requires regular maintenance due to the consumable arc lamps of the video projectors or other high intensity light sources of the video projectors, as well as the required regular maintenance to maintain the mechanical alignment of the video projectors and their associated projection screens. There are also fundamental limitations on the visual accuracy achievable on the projection screens due to losses in projected scene detail in the many optical components needed to create a large field of view projected display.

SUMMARY

The wide field of view mosaic visual display system in an aircraft flight simulator of this disclosure replaces wide field of view display systems, comprising multiple video projectors, lenses, mirrors and projection screens, with the aircraft flight simulator of this disclosure having a visual display system that uses inexpensive, consumer grade flat panel displays. In the aircraft flight simulator, the display panels are active matrix organic lightemitting diode (AMOLED) display panels that are arranged relative to each other to provide a wide field of view display system without large discontinuities in the field of view and without distracting cross reflections between the plurality of display panels used in the display system.

In the aircraft flight simulator, a pilot seat is provided in a central area of the aircraft flight simulator.

A framework of the aircraft flight simulator extends around the pilot seat. The framework positions and supports the plurality of display panels of the flight simulator display system. The framework also supports a blackout curtain or other similar light shielding structure around the pilot seat.

The display panels are supported by the framework at a left hand side of the pilot seat, a right hand side of the pilot seat, above the pilot seat and in front of the pilot seat. Each of the display panels is an AMOLED display panel.

The plurality of display panels include a plurality of side display panels at the left hand side of the pilot seat and a plurality of side display panels at the right hand side of the pilot seat. Each side display panel has a rectangular configuration with a rectangular frame or bezel that extends around the display screen of the side display panel. The plurality of side display panels are arranged in a left side vertical array at the left hand side of the pilot seat, and in a right side vertical array at the right hand side of the pilot seat. For example, three display panels are arranged in the left side vertical array, with a bottom, left side display panel at the bottom of the left side vertical array, an intermediate or upper, left side display panel above the bottom, left side display panel, and a top, left side display panel above the intermediate or upper, left side display panel.

The right side vertical array is also comprised of three right side display panels. The right side vertical array is comprised of a bottom, right side display panel at the bottom of the right side vertical array, an intermediate or upper, right side display panel above the bottom, right side display panel, and a top, right side display panel above the upper or intermediate, right side display panel.

The display panels in the left side vertical array and the display panels in the right side vertical array are supported by the framework with bottom edges and top edges of the display panels in an overlapping arrangement to reduce discontinuities in the field of view from the pilot seat. This results in portions of the frame or bezel that surrounds the display screen of a display panel being overlapped and shielded from view from the pilot seat by an adjacent frame or bezel of an adjacent display panel.

For example, the bottom edge of the intermediate or upper, left side display panel in the left side vertical array is overlapped by the top edge of the bottom, left side display panel in the left side vertical array. This causes the frame or bezel around the screen display of the intermediate or upper, left side display panel to be covered over by and shielded from view from the pilot seat by the frame or bezel at the top edge of the bottom, left side panel display. In a similar manner, the frame or bezel along the bottom edge of the top, left side display panel is covered by the frame or bezel along the top edge of the intermediate or upper, left side display panel and is not visible from the pilot seat.

The three display panels in the right side vertical array are relatively positioned in the same manner as the display panels of the left side vertical array. The bottom edge of the intermediate or upper, right side display panel in the right side vertical array is overlapped or covered over by the top edge of the bottom, right side display panel in the right side vertical array. This causes the frame or bezel around the display screen of the intermediate or upper, right side display panel at the bottom edge of the intermediate or upper, right side display panel to be overlapped or covered over and shielded from view from the pilot seat by the frame or bezel at the top edge of the bottom, right side display panel. The frame or bezel along the bottom edge of the top, right side display panel is overlapped or covered by the frame or bezel along the top edge of the intermediate or upper, right side display panel and is not visible from the pilot seat.

The display panels in the aircraft flight simulator also include a top display panel. The top display panel is positioned and supported by the framework horizontally above the plurality of side display panels arranged in the left side vertical array and above the plurality of side display panels arranged in the right side vertical array. The top display panel also has a rectangular frame or bezel that extends around the display screen of the top display panel.

The frame or bezel at a left side of the top display panel is supported by the framework immediately above and behind the frame or bezel along the top edge of the top, left side display panel and is overlapped or covered by the top edge of the top, left side display panel. Thus, the frame or bezel along the left side edge of the top display panel is not visible from the pilot seat.

The frame or bezel along a right side edge of the top display panel is supported by the framework immediately above and behind the frame or bezel along the top edge of the top, right side display panel and is overlapped or covered by the top edge of the top, right side display panel. Thus, the frame or bezel along the right side edge of the top display panel is not visible from the pilot seat.

In the above manner, the relative positioning of the top display panel, the top, left side display panel and the top, right side display panel reduces the discontinuities in the field of view provided by the top display panel, the top, left side display panel and the top, right side display panel.

The display panels in the aircraft flight simulator also include a plurality of front display panels, for example a center, front display panel, a left front display panel and a right front display panel. Each of the front display panels has a rectangular configuration defined by a rectangular frame or bezel that extends around the display screen of the front display panel. The left front display panel, the center front display panel and the right front display panel are all arranged side by side in front of the pilot seat, in front of the plurality of side display panels and in front of the top display panel.

The center front display panel is positioned between and slightly behind the left front display panel and the right front display panel. The frame or bezel along a right side edge of the left front display panel overlaps and shields from view from the pilot seat the frame or bezel along the left side edge of the center front display panel. The frame or bezel along the left side edge of the right front display panel overlaps and shields from view from the pilot seat the frame or bezel along the right side edge of the center front display panel. The left front display panel and the right front display panel overlapping the center front display panel reduce discontinuities in the field of view from the pilot seat provided by the left front display panel, the center front display panel and the right front display panel.

The forward edges of the plurality of side display panels arranged in the left side vertical array are positioned adjacent the left front display panel with each of the side display panels arranged in the left side vertical array oriented perpendicular relative to the left front display panel. The forward edges of the plurality of side display panels arranged in the right side vertical array are positioned adjacent the right front display panel with each of the side display panels arranged in the right side vertical array oriented perpendicular relative to the right front display panel. The forward edge of the top display panel is positioned adjacent the center front display panel with the top display panel oriented perpendicular relative to the center front display panel.

The plurality of side display panels arranged in the left side vertical array and the right side vertical array are arranged in curved configurations with concavities of the curved configurations being directed toward the pilot seat. The curved configurations of the plurality of side display panels in the left side vertical array and in the right side vertical array direct reflections from the display screens of the plurality of side display panels away from the pilot seat. In this way, reflections from the plurality of side display panels are not visible from the pilot seat.

Additionally, the display screens of all of the display panels in the flight simulator are treated with an anti-glare film to further eliminate reflections from the display screens of the plurality of display panels.

A plurality of cooling fans are supported by the framework inside the flight simulator. The plurality of cooling fans are positioned relative to the plurality of display panels inside the flight simulator to direct cooling air across the display screens of the plurality of display panels in operation of the plurality of cooling fans.

The features, functions, and advantages that have been discussed can be achieved independently in various embodiments or may be combined in yet other embodiments, further details of which can be seen with reference to the following description and drawings.

BRIEF DESCRIPTION OF THE DRAWINGS

Further features of the wide field of view mosaic visual display system in an aircraft flight simulator using flat panel displays are set forth in the following detailed description and drawing figures.

DETAILED DESCRIPTION

The wide field of view mosaic visual display system in an aircraft flight simulator of this disclosure is a visual display system that uses inexpensive, consumer grade flat display panels. In the aircraft flight simulator, all of the display panels are active matrix organic light-emitting diode (AMO-LED) display panels. The flat display panels are positioned around the pilot seat of the flight simulator and are arranged relative to each other to provide a wide field of view display system without large discontinuities in the field of view between adjacent display panels and without distracting cross reflections between the plurality of display panels used in the display system. Other equivalent flat panel display panels could also be used.

In the aircraft flight simulator 10 represented in FIGS. 1-4, a pilot seat 12, an instrumentation panel 14 and flight controls, or other equivalent simulator flight deck configurations are provided in a central area of the aircraft flight simulator. These features of the aircraft flight simulator 10 are conventional.

A framework 16 of the aircraft flight simulator 10 is a three dimensional structure that extends around the pilot seat 12. The framework 16 positions and supports the plurality of display panels of the flight simulator display system. The framework 16 also supports a blackout curtain or drape or other similar light shielding structure (not shown) around the pilot seat 12.

A plurality of display panels are supported by the framework 16 inside the flight simulator 10. The display panels are supported by the framework 16 at a left hand side of the pilot seat 12, at a right hand side of the pilot seat 12, above the pilot seat 12 and in front of the pilot seat 12. Each of the display panels is an AMOLED display panel. The display panels are commercial grade, are lightweight and are extremely thin. For example, each display panel has a thickness dimension of ¼ inch, and each display panel has a display screen diagonal dimension of 55". Each display panel has a frame or bezel that extends completely around the display screen of the display panel. The frame or bezel has a width dimension of approximately 10 mm at the top and bottom of the display screen, and at the left side and right side of the display screen.

The plurality of display panels include a plurality of side display panels at the left hand side of the pilot seat 12 and at the right hand side of the pilot seat 12. The plurality of side display panels are identified as "side" display panels because they are arranged at the left hand side of the pilot seat 12 and the right hand side of the pilot seat 12. Each side display panel has a rectangular configuration defined by a bottom edge of the side display panel and a top edge of the side display panel that is opposite the bottom edge, and by a rearward edge of the side display panel and a forward edge of the side display panel that is opposite the rearward edge.

Figure 2:
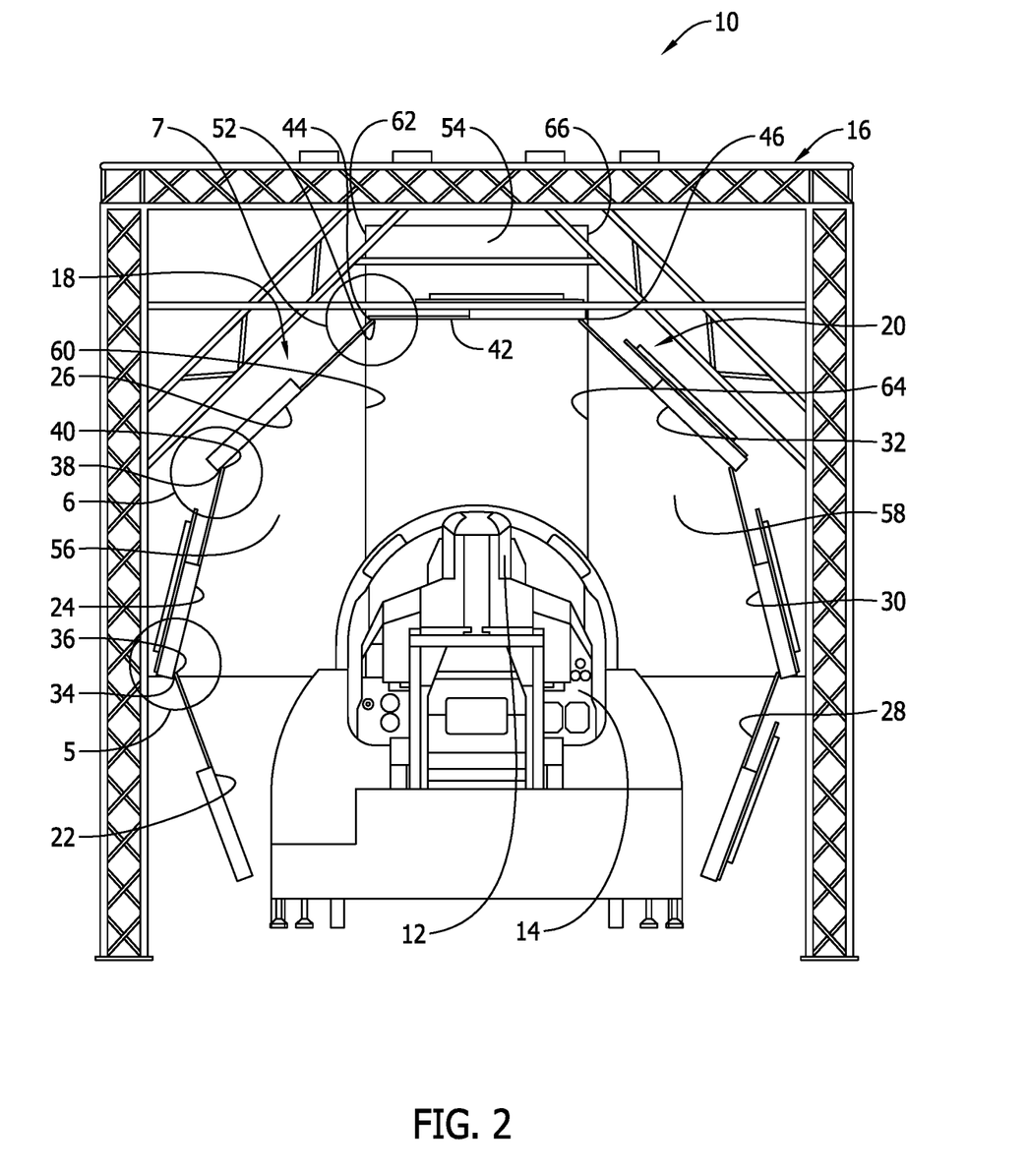
FIG. 2 is a representation of a forward looking elevation view of the visual display system.

As represented in FIG. 2, the plurality of side display panels are arranged in a left side vertical array 18 at the left hand side of the pilot seat 12, and in a right side vertical array 20 at the right hand side of the pilot seat 12. For example, three display panels 22, 24, 26 are arranged in the left side vertical array 18, with a bottom, left side display panel 22 at the bottom of the left side vertical array 18, an intermediate or upper, left side display panel 24 above the bottom, left side display panel 22, and a top, left side display panel 26 above the intermediate or upper, left side display panel 24. Other numbers of side display panels could be used to form the left side vertical array.

With the left side vertical array 18 being comprised of three left side display panels, the right side vertical array 20 is also comprised of three right side display panels 28, 30, 32. The right side vertical array 20 is comprised of a bottom, right side display panel 28 at the bottom of the right side vertical array 20, an intermediate or upper, right side display panel 30 above the bottom, right side display panel 28, and a top, right side display panel 32 above the upper or intermediate, right side display panel 28.

In order to reduce discontinuities in the field of view from the pilot seat 12 provided by the left side vertical array 18 of display panels and the right side vertical array 20 of display panels, the display panels 22, 24, 26 in the left side vertical array 18 and the display panels 28, 30, 32 in the right side vertical array 20 are supported by the framework 16 with the bottom edges and top edges of the display panels in an overlapping arrangement. This results in portions of the frame or bezel that surrounds the display screen of a display panel to be overlapped and shielded from view from the pilot seat 12 by an adjacent frame or bezel of an adjacent display panel.

Figure 5:
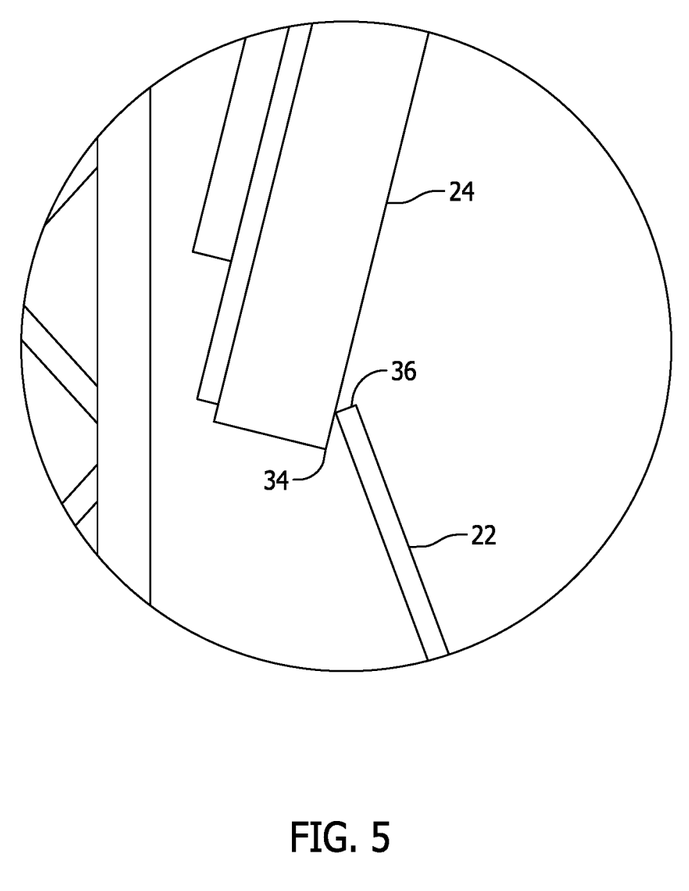
FIG. 5 is a representation of an enlarged view of a portion of the visual display system in the circle labeled "5" in FIG. 2.
Figure 6:
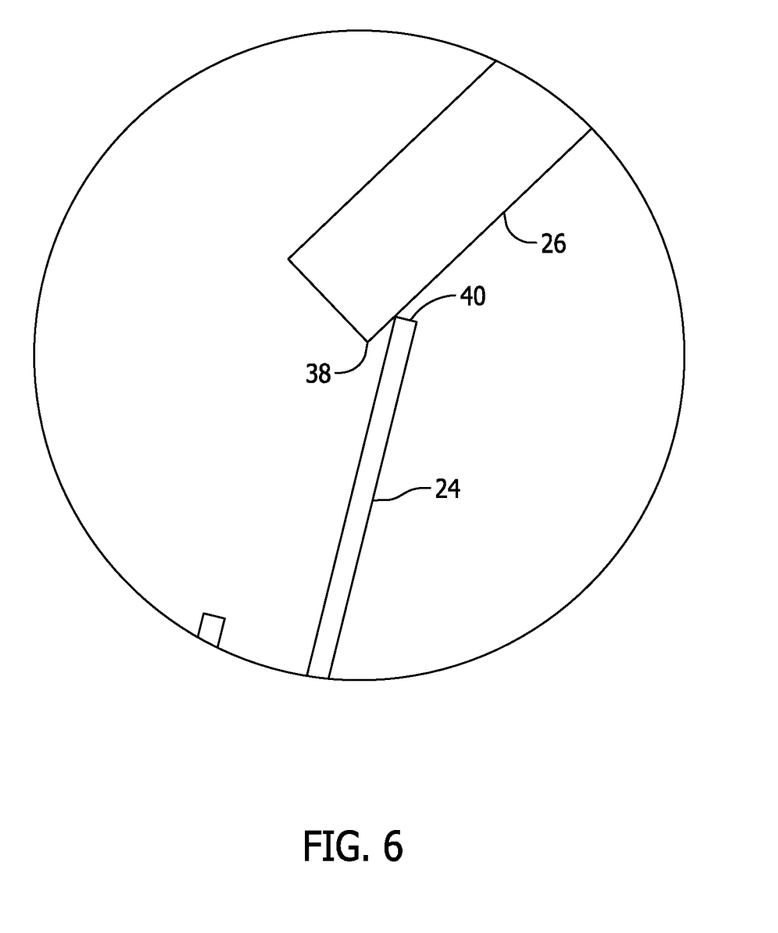
FIG. 6 is a representation of an enlarged view of a portion of the visual display system in the circle labeled "6" in FIG. 2.

For example, as represented in FIGS. 2 and 5, the bottom edge 34 of the intermediate or upper, left side display panel 24 in the left side vertical array 18 is overlapped by the top edge 36 of the bottom, left side display panel 22 in the left side vertical array 18. This causes the frame or bezel at the bottom edge 34 of the intermediate or upper, left side display panel 24 to be overlapped or covered over by and shielded from view from the pilot seat 12 by the frame or bezel at the top edge 36 of the bottom, left side display panel 22. Thus, instead of both of the frame or bezel along the top edge 36 of the bottom, left side display panel 22 and the frame or bezel along the bottom edge 34 of the intermediate or upper, left side display panel 24 being positioned side by side and visible from the pilot seat 12, the frame or bezel along the bottom edge 34 of the intermediate or upper, left side display panel 24 is overlapped or covered by the frame or bezel along the top edge 36 of the bottom, left side display panel 22 and is not visible from the pilot seat 12. Alternatively, the top edge 36 of the bottom, left side display panel 22 could be overlapped by the bottom edge 34 of the intermediate or upper, left side display panel 24. In a similar manner, as represented in FIGS. 2 and 6, the frame or bezel along the bottom edge 38 of the top, left side display panel 26 is overlapped or covered by the frame or bezel along the top edge 40 of the intermediate or upper, left side display panel 24 and is not visible from the pilot seat 12. Alternatively, the top edge 40 of the intermediate or upper, left side display panel 24 could be overlapped by the bottom edge 38 of the top, left side display panel 26. This relative positioning of the bottom, left side display panel 22, the intermediate or upper, left side display panel 24 and the top, left side display panel 26 reduces the discontinuities in the field of view provided by the plurality of side display panels arranged in the left side vertical array 18.

The three display panels 28, 30, 32 in the right side vertical array 20 are relatively positioned in the same manner as the display panels 22, 24, 26 of the left side vertical array 18. The bottom edge of the intermediate or upper, right side display panel 30 in the right side vertical array 20 is overlapped or covered over by the top edge of the bottom, right side display panel 28 in the right side vertical array 20. The overlapping relationship is a mirror image of that represented in FIG. 5. This causes the frame or bezel around the display screen of the intermediate or upper, right side display panel 30 at the bottom edge of the intermediate or upper, right side display panel 30 to be overlapped or covered over and shielded from view from the pilot seat 12 by the frame or bezel at the top edge of the bottom, right side display panel 28. Thus, instead of both the frame or bezel along the top edge of the bottom, right side display panel 28 and the frame or bezel along the bottom edge of the intermediate or upper, right side display panel 30 being positioned side by side and visible from the pilot seat 12, the frame or bezel along the bottom edge of the intermediate or upper, right side display panel 30 is covered by the frame or bezel along the top edge of the bottom, right side display panel 28 and is not visible from the pilot seat 12. The frame or bezel along the bottom edge of the top, right side display panel 32 is overlapped or covered by the frame or bezel along the top edge of the intermediate or upper, right side display panel 30 and is not visible from the pilot seat 12. This overlapping relationship is a mirror image of that represented in FIG. 6. This relative positioning of the bottom, right side display panel 28, the intermediate or upper, right side display panel 30 and the top, right side display panel 32 reduces the discontinuities in the field of view provided by the plurality of side display panels arranged in the left side vertical array 18 and the plurality side display panels arranged in the right side vertical array 20.

The display panels in the aircraft flight simulator 10 also include a top display panel 42. The top display panel 42 is positioned and supported by the framework 16 horizontally above the plurality of side display panels 22, 24, 26 arranged in the left side vertical array 18 and above the plurality of side display panels 28, 30, 32 arranged in the right side vertical array 20.

The top display panel 42 has a rectangular configuration defined by a left side edge 44 of the top display panel 42 and a right side edge 46 of the top display panel 42 that is opposite the left side edge 44, and by a rearward edge 48 of the top display panel 42 and a forward edge 50 of the top display panel 42 that is opposite the rearward edge 48. The top display panel 42 also has a rectangular frame or bezel that extends around the display screen of the top display panel 42.

Figure 7:
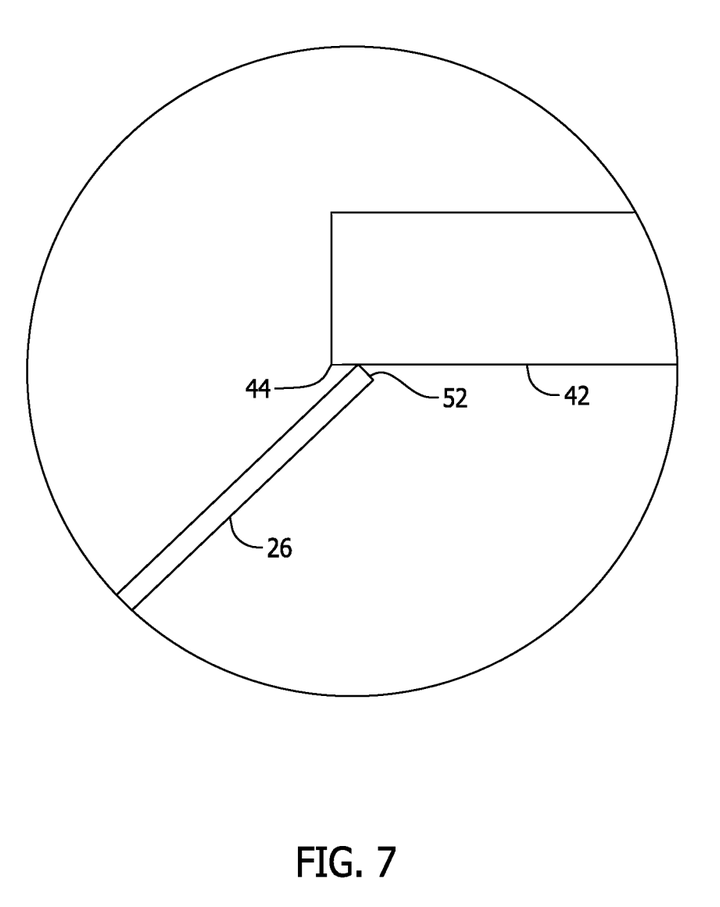
FIG. 7 is a representation of an enlarged view of a portion of the visual display system in the circle labeled "7" in FIG. 2.

As represented in FIGS. 2 and 7, the frame or bezel at the left side edge 44 of the top display panel 42 is supported by the framework 16 immediately above and behind the frame or bezel along the top edge 52 of the top, left side display panel 26 and is overlapped by the top edge 52 of the top, left side display panel 26. Thus, the frame or bezel along the left side edge 44 of the top display panel 42 is not visible from the pilot seat 12.

The frame or bezel along the right side edge 46 of the top display panel 42 is supported by the framework 16 immediately above and behind the frame or bezel along the top edge of the top, right side display panel 32 and is overlapped by the top edge of the top, right side display panel 32. The overlapping relationship is a mirror image of that represented in FIG. 7. Thus, the frame or bezel along the right side edge 46 of the top display panel 42 is not visible from the pilot seat 12.

In the above manner, the relative positioning of the top display panel 42, the top, left side display panel 26 and the top, right side display panel 32 reduces the discontinuities in the field of view provided by the top display panel 42, the top, left side display panel 26 and the top, right side display panel 32.

Figure 1:
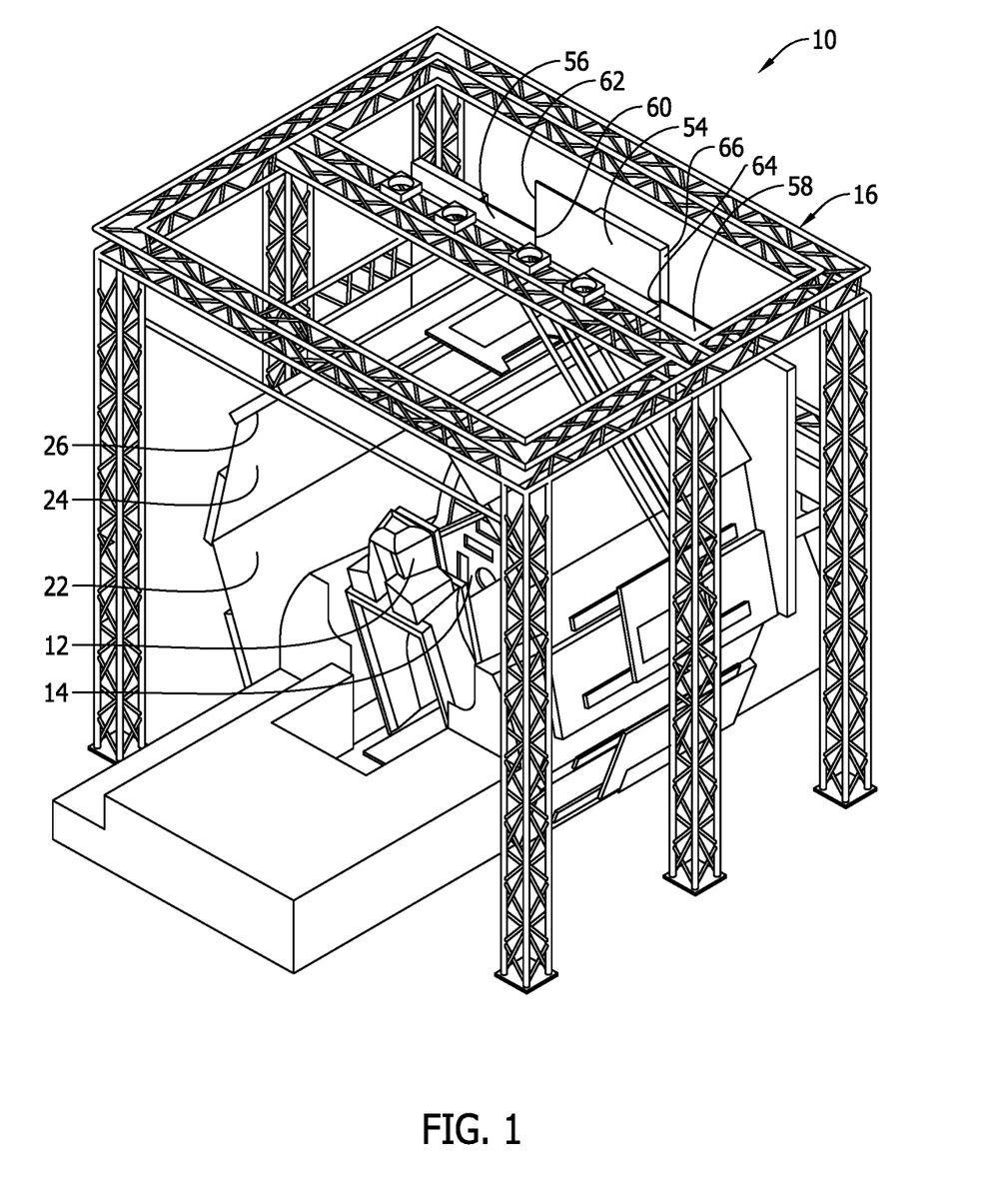
FIG. 1 is a representation of an elevation, perspective view of the visual display system in an aircraft flight simulator using flat display panels of this disclosure.
Figure 3:
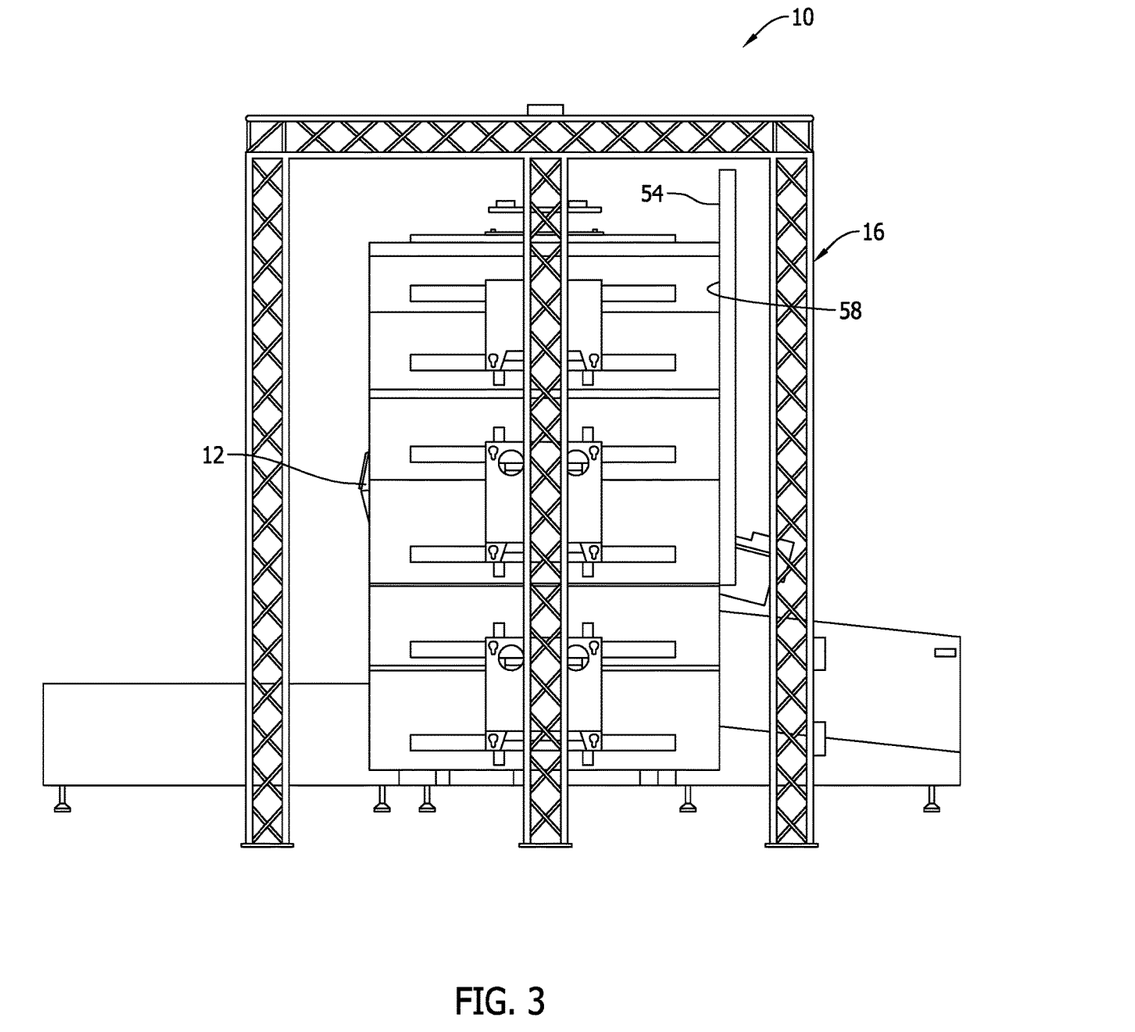
FIG. 3 is a representation of a right side elevation view of the visual display system, with the left side elevation view of the visual display system being a mirror image thereof.
Figure 4:
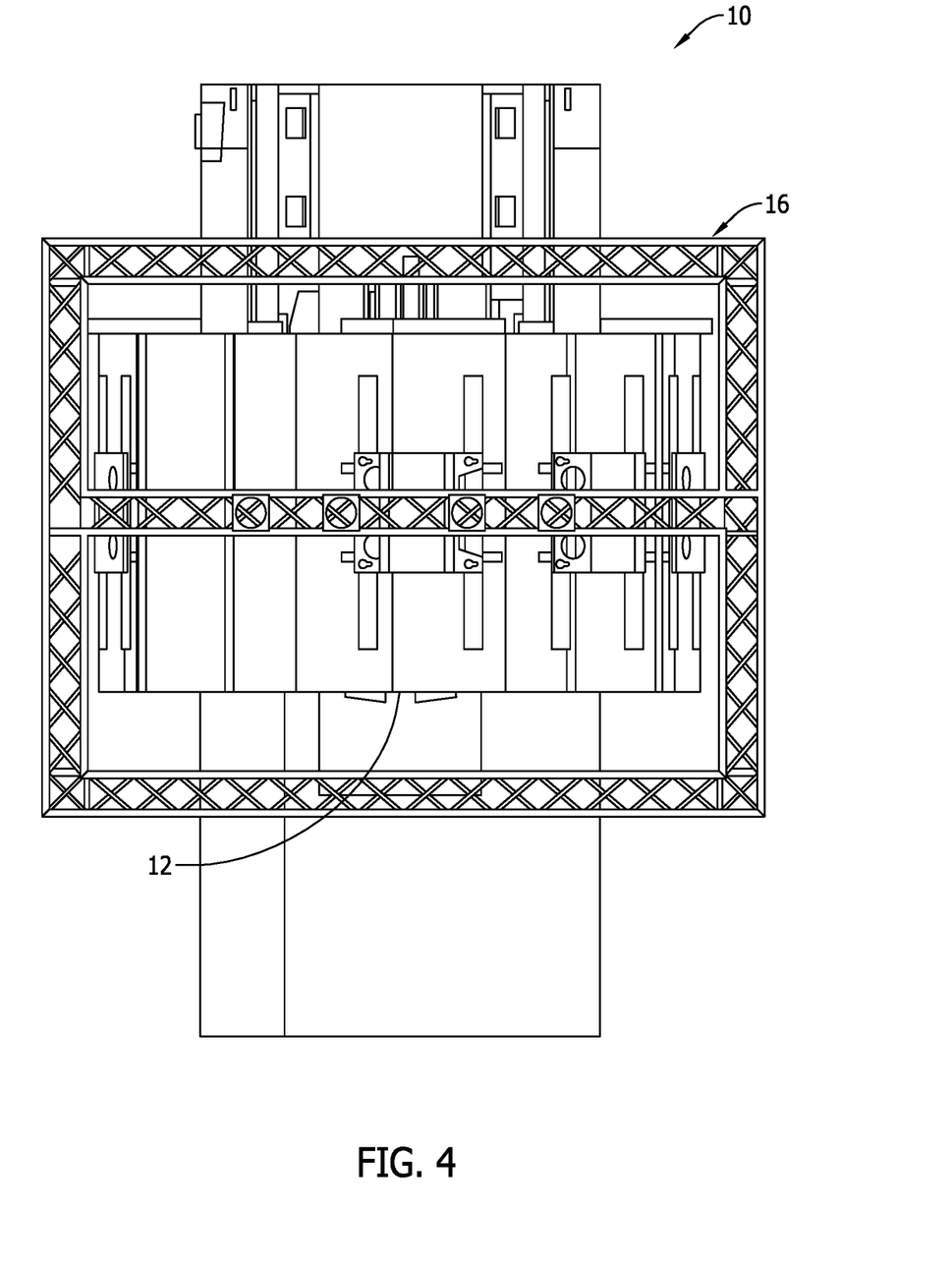
FIG. 4 is a representation of a plan view of the visual display system.

The display panels in the aircraft flight simulator 10 also include a plurality of front display panels, for example a center front display panel 54, a left front display panel 56 and a right front display panel 58. Each of the front display panels 54, 56, 58 has a rectangular configuration defined by a left side edge of each front display panel 54, 56, 58, a right side edge of each of the front display panels 54, 56, 58 that is opposite the left side edge, a bottom edge of each front display panel 54, 56, 58, and a top edge of each front display panel 54, 56, 58 that is opposite the bottom edge. The left front display panel 56, the center front display panel 54 and the right front display panel 58 are arranged side by side in front of the pilot seat 12, in front of the plurality of side display panels and in front of the top display panel 42. The center front display panel 54 is elevated slightly above the left front display panel 56 and the right front display panel 58 as represented in FIGS. 1, 2 and 3.

The center front display panel 54 is positioned between and slightly behind the left front display panel 56 and the right front display panel 58. As represented in FIGS. 1 and 2, the frame or bezel along the right side edge 60 of the left front display panel 56 overlaps and shields from view from the pilot seat 12 the frame or bezel along the left side edge 62 of the center front display panel 54. The frame or bezel along the right side edge 60 of the left front display panel 56 is also aligned with the top edge 52 of the top left display panel 26 in the left side vertical array 18. The frame or bezel along the left side edge 64 of the right front display panel 58 overlaps and shields from view from the pilot seat 12 the right side edge 66 of the center front display panel 54. The frame or bezel along the left side edge 64 of the right front display panel 58 is also aligned with the top edge of the top right display panel 32. The left front display panel 56 and the right front display panel 58 overlapping the center front display panel 54 reduce discontinuities in the field of view from the pilot seat 12 provided by the left front display panel 56, the center front display panel 54 and the right front display panel 58.

The forward edges of the plurality of side display panels 22, 24, 26 arranged in the left side vertical array 18 are positioned adjacent the left front display panel 56 with each of the side display panels 22, 24, 26 arranged in the left side vertical array 18 oriented perpendicular relative to the left front display panel 56. The forward edges of the plurality of side display panels 28, 30, 32 arranged in the right side vertical array 20 are positioned adjacent the right front display panel 58 with each of the side display panels 28, 30, 32 arranged in the right side vertical array 20 oriented perpendicular relative to the right front display panel 58. The forward edge 50 of the top display panel 42 is positioned adjacent the center front display panel 54 with the top display panel 42 oriented perpendicular relative to the center front display panel 54.

As represented in FIG. 2, the plurality of left side display panels 22, 24, 26 arranged in the left side vertical array 18 are arranged in a curved configuration with a concavity of the curved configuration being directed toward the pilot seat 12. The plurality of right side display panels 28, 30, 32 in the right side vertical array 20 are arranged in a curved configuration with a concavity that is directed toward the pilot seat 12. The curved configurations of the plurality of left side display panels 22, 24, 26 in the left side vertical array 18 and the plurality of right display panels 28, 30, 32 in the right side vertical array 20 direct reflections from the display screens of the side display panels away from the pilot seat 12. In this way, reflections from the plurality of side display panels are not visible from the pilot seat 12.

Additionally, the display screens of all of the display panels are treated with an anti-glare film to eliminate reflections from the display screens.

A plurality of cooling fans (not shown) are supported by the framework 16 inside the flight simulator 10. The plurality of cooling fans are positioned relative to the plurality of display panels to direct cooling air across the display screens of the display panels on operation of the plurality of cooling fans.

As various modifications could be made in the construction of the wide field of view mosaic visual display system in an aircraft flight simulator using flat display panels and its method of operation herein described and illustrated without departing from the scope of the invention, it is intended that all matter contained in the foregoing description or shown in the accompanying drawings shall be interpreted as illustrative rather than limiting. Thus, the breadth and scope of the present disclosure should not be limited by any of the above described exemplary embodiments, but should be defined only in accordance with the following claims appended hereto and their equivalents.

The invention claimed is:
1. An aircraft flight simulator comprising:
a pilot seat;

a plurality of side display panels arranged in a major arc centered around the pilot seat, wherein the plurality of side display panels includes a left side vertical array of at least two of the plurality of side display panels disposed at a left hand side of the pilot seat and a right side vertical array of at least two of the plurality of side display panels disposed at a right hand side of the pilot seat; and a plurality of front display panels located in front of the pilot seat, wherein the plurality of front display panels includes a left-front display panel and a right-front display panel, wherein:

the plurality of side display panels in the left side vertical array are adjacent to the left-front display panel, aligned perpendicular to the left-front display panel, obscures an upper portion of the left-front display panel as viewed from the pilot seat, and obscures a left portion of the left-front display panel as viewed from the pilot seat; and the plurality of side display panels in the right side vertical array of are adjacent to the right-front display panel, aligned perpendicular to the right-front display panel, obscures an upper portion of the right-front display panel as viewed from the pilot seat, and obscures a right portion of the right-front display panel as viewed from the pilot seat.

2. The aircraft flight simulator of claim 1, wherein the plurality of side display panels are active matrix organic light-emitting diode flat display panels.

3. The aircraft flight simulator of claim 1, wherein:
a top edge of a bottom-left side display panel of the plurality of side display panels overlaps in front of a bottom edge of an upper-left side display panel of the plurality of display panels as viewed from the pilot seat; and
a top edge of a bottom-right side display panel of the plurality of side display panels overlaps in front of a bottom edge of an upper-right side display panel of the plurality of side display panels as viewed from the pilot seat.

4. The aircraft flight simulator of claim 1, further comprising:
a top display panel arranged in the major arc, wherein the top display panel has a display screen and a bezel frame that extends completely around the display screen of the top display panel, and wherein the top display panel is oriented horizontally and is positioned above the left side vertical array and above the right side vertical array.

5. The aircraft flight simulator of claim 4, wherein:
a bezel frame of an upper-left side display panel in the left side vertical array overlaps the bezel frame along a left side edge of the top display panel; and
a bezel frame of an upper-right side display panel in the right side vertical array overlaps the bezel frame along a right side edge of the top display panel.

6. The aircraft flight simulator of claim 1, wherein a plurality of bottom edges of the plurality of side display panels and a plurality of top edges of the plurality of side display panels are parallel to each other.

7. The aircraft flight simulator of claim 1, wherein:
the plurality of front display panels includes a center-front display panel;
the plurality of front display panels are arranged side by side in front of the pilot seat; and
the left-front display panel and the right-front display panel overlap the center-front display panel.

8. The aircraft flight simulator of claim 1, wherein each of the plurality of front display panels is an active matrix organic light-emitting diode flat display panel.

9. The aircraft flight simulator of claim 1, wherein:
the left side vertical array includes at least three of the plurality of side display panels; and
the right side vertical array includes at least three of the plurality of side display panels.

10. The aircraft flight simulator of claim 9, wherein:
the plurality of side display panels in the left side vertical array are arranged in a first vertically curved configuration with a first concavity that is directed toward the pilot seat; and
the plurality of side display panels in the right side vertical array are arranged in a second vertically curved configuration with a second concavity that is directed toward the pilot seat.

11. An aircraft flight simulator comprising:
a pilot seat;
a plurality of side display panels arranged in a major arc centered around the pilot seat and extending from a left hand side of the pilot seat to a right hand side of the pilot seat; and
a plurality of front display panels located in front of the pilot seat, wherein the plurality of front display panels includes a left-front display panel, a right-front display panel, and a center-front display panel and wherein:

the plurality of side display panels on the left hand side of the pilot seat is adjacent to the left-front display panel, aligned perpendicular to the left-front display panel, obscures an upper portion of the left-front display panel as viewed from the pilot seat, and obscures a left portion of the left-front display panel as viewed from the pilot seat; and the plurality of side display panels on the right hand side of the pilot seat is adjacent to the right-front display panel, aligned perpendicular to the right-front display panel, obscures an upper portion of the right-front display panel as viewed from the pilot seat, and obscures a right portion of the right-front display panel as viewed from the pilot seat.

12. The aircraft flight simulator of claim 11, wherein the plurality of side display panels and the plurality of front display panels are active matrix organic light-emitting diode flat display panels.

13. The aircraft flight simulator of claim 11, wherein:
one of the plurality of side display panels arranged on the left hand side of the pilot seat is a bottom-left side display panel;
one of the plurality of side display panels arranged on the left hand side of the pilot seat is an upper-left side display panel disposed above the bottom-left side display panel;
a top edge of the bottom-left side display panel and a bottom edge of the upper-left side display panel overlap;
one of the plurality of side display panels arranged on the right hand side of the pilot seat is a bottom-right side display panel;
one of the plurality of side display panels arranged on the right hand side of the pilot seat is an upper-right side display panel above the bottom-right side display panel; and
a top edge of the bottom-right side display panel and a bottom edge of the upper-right side display panel overlap.

14. The aircraft flight simulator of claim 11, further comprising:
a top display panel arranged in the major arc, oriented horizontally, and positioned above the plurality of side display panels.

15. The aircraft flight simulator of claim 14, wherein:
the top display panel has a rectangular configuration defined by a left side edge of the top display panel and a right side edge of the top display panel that is opposite the left side edge of the top display panel, and by a rearward edge of the top display panel and a forward edge of the top display panel that is opposite the rearward edge;
the forward edge of the top display panel is positioned adjacent to the center-front display panel; and
a display screen of the top display panel is oriented perpendicular relative to a display screen of the center-front display panel.

16. The aircraft flight simulator of claim 15, wherein a plurality of bottom edges of the plurality of side display panels, a plurality of top edges of the plurality of side display panels, the left side edge of the top display panel, and the right side edge of the top display panel are parallel to each other.

17. The aircraft flight simulator of claim 15, wherein:
the plurality of front display panels are arranged side by side with the center-front display panel;
the center-front display panel is positioned behind the left-front display panel and the right-front display panel;
a plurality of forward edges of the plurality of side display panels are positioned adjacent to the left-front display panel and the right-front display panel; and
the forward edge of the top display panel is positioned adjacent to the center-front display panel.

18. The aircraft flight simulator of claim 11, wherein:
the plurality of side display panels arranged on the left hand side of the pilot seat are arranged in a first vertically curved configuration with a first concavity that is directed toward the pilot seat; and
the plurality of side display panels arranged on the right hand side of the pilot seat are arranged in a second vertically curved configuration with a second concavity that is directed toward the pilot seat.

19. A method to display images in an aircraft flight simulator, the method comprising:
arranging a plurality of side display panels in a major arc centered around a pilot seat in the aircraft flight simulator, wherein the plurality of side display panels includes a left side vertical array at a left side of the pilot seat and a right side vertical array at a right side of the pilot seat;
arranging a plurality of front display panels in vertically oriented positions in front of the pilot seat in the aircraft flight simulator, wherein the plurality of front display panels includes a left-front display panel and a right-front display panel, and wherein:
the plurality of side display panels in the left side vertical array is adjacent to the left-front display panel, aligned perpendicular to the left-front display panel, obscures an upper portion of the left-front display panel as viewed from the pilot seat, and obscures a left portion of the left-front display panel as viewed from the pilot seat; and
the plurality of side display panels in the right side vertical array of is adjacent to the right-front display panel, aligned perpendicular to the right-front display panel, obscures an upper portion of the right-front display panel as viewed from the pilot seat, and obscures a right portion of the right-front display panel as viewed from the pilot seat; and
transferring a plurality of signals that convey the images to the plurality of side display panels and the plurality of front display panels.

20. The method of claim 19, further comprising:
using active matrix organic light-emitting diode flat display panels as the plurality of side display panels and the plurality of front display panels.

* * * * *